H. A. HOKE.
CROSSHEAD WRIST PIN FOR LOCOMOTIVES.
APPLICATION FILED FEB. 26, 1919.
1,312,987.
Patented Aug. 12, 1919.
2 SHEETS—SHEET 1.
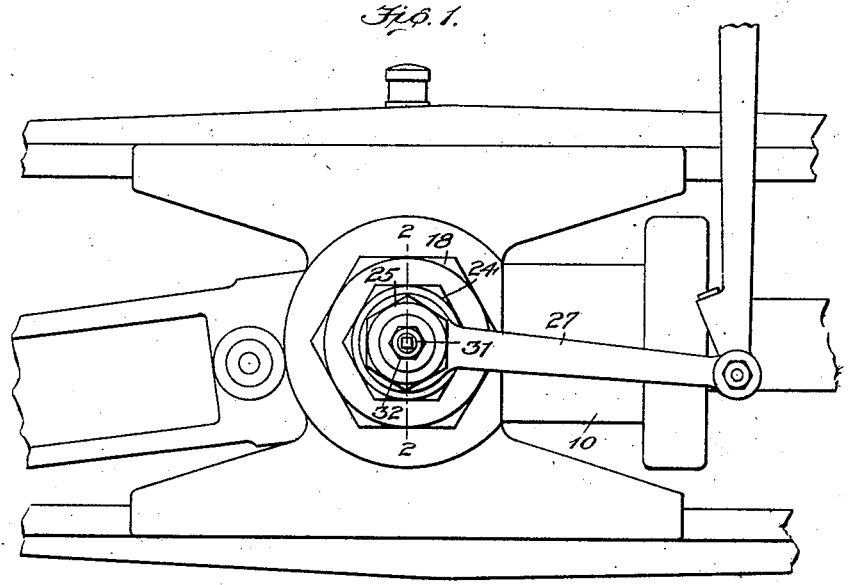
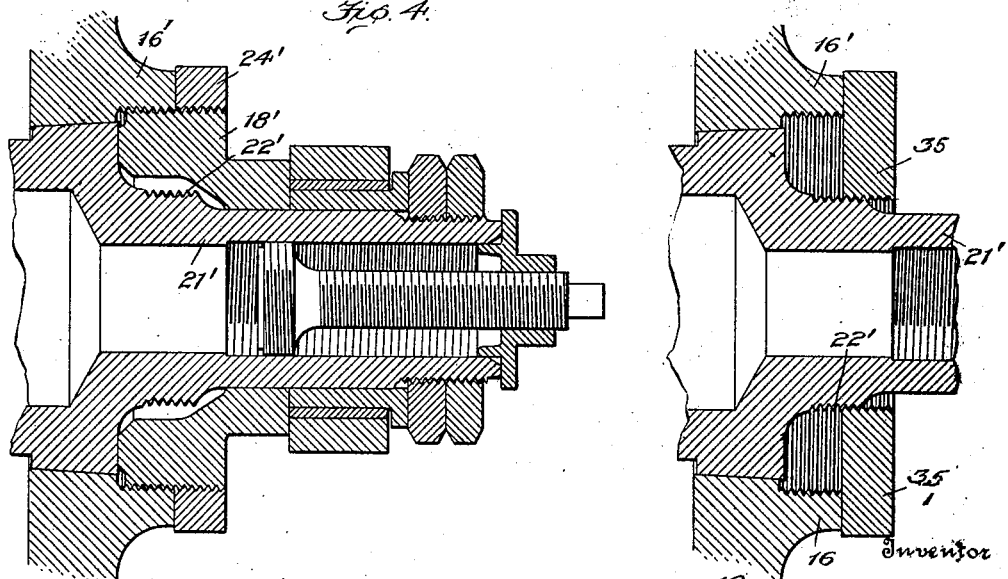

H. A. HOKE.
CROSSHEAD WRIST PIN FOR LOCOMOTIVES.
APPLICATION FILED FEB. 26, 1919.
1,312,987.
Patented Aug. 12, 1919.
2 SHEETS—SHEET 2.
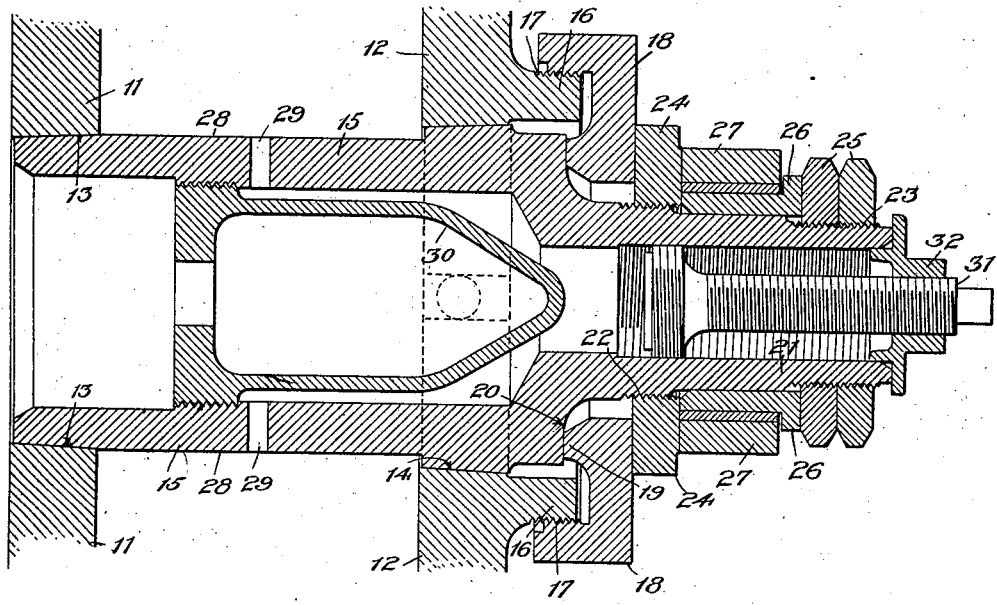
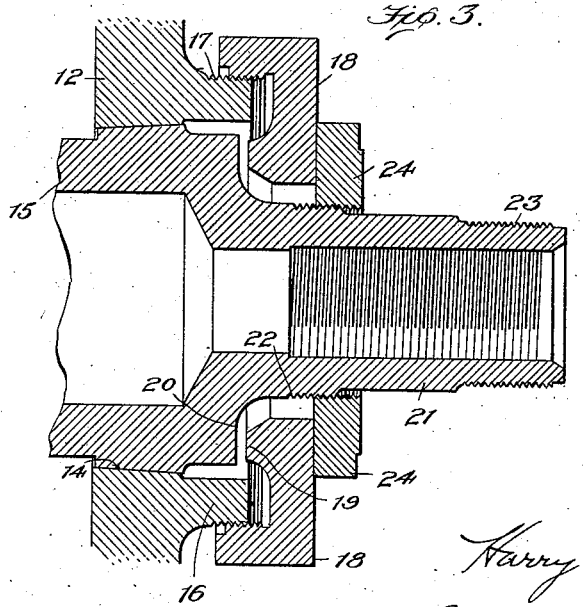

UNITED STATES PATENT OFFICE.

HARRY A. HOKE, OF ALTOONA, PENNSYLVANIA.

CROSSHEAD WRIST-PIN FOR LOCOMOTIVES.

1,312,987. Specification of Letters Patent. Patented Aug. 12, 1919.

Application filed February 26, 1919. Serial No. 279,240.

*To all whom it may concern:*

Be it known that I, HARRY A. HOKE, a citizen of the United States, and residing at Altoona, Blair county, State of Pennsylvania, have invented certain new and useful Improvements in Crosshead Wrist-Pins for Locomotives, of which the following is a specification.

This invention relates to cross heads for locomotives or other similar large sized engines and has for its object to provide an article of this class having a wrist pin of such design that it may be quickly and easily removed to disconnect the connecting rod when desired. It particularly relates to locomotives, where the side of the cross head which faces outwardly is easily accessible while the other face is in close proximity to the driving wheel and other mechanism of the locomotive. In such cases it is desirable to insert the wrist pin from the front of the cross head and to remove it in the same manner, thus avoiding shifting the engine back and forth until the wrist pin can be inserted or driven out between the spokes of the driving wheel, as must be done in nearly every case where the wrist pin is applied and removed from the back or inside of the cross head.

Another object of the invention is to provide a convenient means for exerting a powerful pull on the wrist pin to withdraw the same when it is desired to disconect the connecting rod, thus avoiding the use of special tools, or avoiding the necessity of excessive hammering of the pin.

The invention will be fully disclosed in the following description when taken in connection with the accompanying drawings in which:—

Figure 1 is a side elevation of a cross head mounted on its guides and having my improved wrist pin connection incorporated therewith;

Fig. 2 is a section along the line 2—2 of Fig. 1;

Fig. 3 is a view similar to Fig. 2 part broken away and showing some of the elements in position to extract the pin from the cross head;

Fig. 4 is a longitudinal section of a modified form of wrist pin connection;

Fig. 5 is a view similar to Fig. 4 with part broken away and showing the mechanism for extracting the pin in this modification.

The cross head comprises essentially a single piece having the usual piston rod receiving sleeve 10 and the inner and outer vertical walls 11 and 12 to the horizontal upper and lower edges of which the bearing shoes are adapted to be bolted or otherwise secured. The inner and outer walls 11 and 12 are provided with axially alined tapering openings 13 and 14 respectively adapted to receive with a close fit similarly tapering bearing surfaces on the wrist pin 15 which is adapted to be inserted into the cross head from the "outside," that is, from the side facing away from the driving wheels or other machinery. Extending outwardly from the outer wall is a boss 16 externally threaded at 17 and having a cylindrical opening therethrough axially alined with the tapering openings 13 and 14 and of such diameter that the wrist pin freely passes through when being inserted into the cross head or withdrawn therefrom. Mounted on the boss 16 is an internally threaded annular member 18, the threaded portion of which engages the thread 17 of the boss 16 and which has a portion 19 adapted to engage the annular surface 20 of the wrist pin 15 and to force the wrist pin to seat in the openings 13 and 14 and to hold it in such position, when the annular member is turned in the proper direction.

Extending outwardly from the body or main portion of the wrist pin 15 is a hollow shank 21 externally threaded at 22 and 23 to receive the lock nuts 24 and 25, 25, respectively. The threads 23 may be of any convenient pitch but the threads 22 are always of a pitch somewhat less than the pitch of the external thread 17 on the boss 16. A washer 26 extends along the shank 21 and bears against the lock nut 24 at one end and the lock nuts 25, 25 at its other end. The end of the cross head link 27 is mounted on this washer 26. The annular member or forcing nut 18 is held in its locking position by the three lock nuts 24, and 25, 25, respectively, and when the same are tightened it is impossible for the member 18 to become loose and release the wrist pin.

To remove the wrist pin it is only necessary to remove the lock nuts 25, 25, the washer 26, cross head link 27, and then to simultaneously rotate or unscrew the annular member 18 and the lock nut 24. As the threads 17 and 22 run in the same direction, the annular member 18 will tend to turn off of the boss 16 and the lock nut 24 off of the threaded portion 22 of the shank 21. Assuming that the thread 17 has a pitch of 8 per inch while the threads 22 have a pitch of 10 per inch, it is readily seen that when both the member 18 and the nut 24 are rotated simultaneously through one revolution, the member 18 will have traveled ⅛ of an inch outwardly along the boss 16 and the lock nut 24 will have traveled 1/10 of an inch outwardly along the shank 21. The wrist pin 15 has, therefore, been withdrawn from the cross head a distance equal to ⅛″ minus 1/10 of an inch, or a distance equal to .025 of one inch. In this manner a moderate rotative force exerted on the nuts 18 and 24 exerts a very powerful pulling force on the wrist pin 15 because of the differential action of the threads, and the wrist pin may be withdrawn from the cross head no matter how tightly it has become jammed, without the use of special tools or by hammering.

In Fig. 3 the parts are shown in position for extracting the pin in the manner above described.

The wrist pin is made hollow to cut down weight and to provide an internal lubricating means for the connecting rod bearing. I have illustrated a well known means of lubricating the cylindrical portion 28 of the wrist pin, which comprises radial grease or oil holes 29, 29, a hollow casting 30 threaded in the interior of the wrist pin, a threaded grease cup plunger 31 in the hollow shank 21 of the wrist pin, and a lock nut 32 therefor. The hollow casting 30 simply does away with the necessity of having a large amount of grease and the grease cup plunger 31 is of the usual type, being adjusted from the outside from time to time to force grease contained within the wrist pin radially outward through the openings 29 on to the bearing surface 28. The lubricating means just described is not a part of my invention and is not claimed.

In Figs. 4 and 5 I have illustrated a modified form of my invention in which the boss 16 is interiorly threaded and the annular member or forcing nut 18′ is exteriorly threaded to correspond. In addition, the lock nut 24′ bears on the end of the boss 16′ instead of on the annular member or forcing nut 18′. The remainder of the construction is substantially the same as in the preferred form. It will be noted that in the modification the shank 21′ of the wrist pin is exteriorly threaded at 22′ although when the wrist pin is in its locked position this thread has no function. An inspection of Fig. 5, however, shows that the threaded portion 22′ of the shank 21′ is adapted to receive the internally threaded portion of a "puller" nut 35 which is adapted to bear against the outer end of the annular boss 16′. When it is desired to remove the wrist pin, the lock nuts, cross head link, and washer are removed, as well as the annular member or forcing nut 18′. The "puller" nut 35 is then screwed on the shank of the wrist pin and by continuing to rotate the same after it has abutted against the annular end of boss 16′, it is apparent that the wrist pin will be withdrawn from its seat by the nut 35 acting with great mechanical advantage.

From the above description it is apparent that the wrist pin of the improved cross head may be easily inserted from the outside, thus avoiding all inconvenience due to the proximity of the machinery parts, and is securely held in these seats by a plurality of lock nuts which absolutely prevent its accidental movement, and may be quickly removed no matter how tightly jammed.

Having thus described my invention what I claim as new and desire to secure by Letters Patent is clearly pointed out in the appended claims:

1. In a cross head for locomotives, the combination with the inner wall having an opening therein and the outer wall having on its outer side an externally threaded boss with an opening therethrough, of a wrist pin fitting said openings and an annular member having an internally threaded portion to engage the thread on said boss, and a portion to engage and lock said pin in said openings.

2. In a cross head for locomotives, the combination with the inner wall having an opening therein and the outer wall having on its outer side an externally threaded boss with an opening therethrough, of a wrist pin fitting said openings and having an externally threaded shank extending outwardly past the outer wall and an annular bearing surface around said shank, an annular member having an internally threaded portion to engage the thread on said boss and a portion to engage the annular bearing surface on the pin and lock said pin in said openings, and an internally threaded nut mounted on said threaded shank and bearing on said annular member to lock the same in position.

3. In a cross head for locomotives, the combination with the inner wall having an opening therein and the outer wall having on its outer side an externally threaded boss with an opening therethrough, of a wrist pin fitting said openings and having an externally threaded shank extending outwardly past the outer wall, said thread being in the same direction as the thread on the annular boss but having a smaller pitch, an annular member having an internally threaded portion to engage the thread on said boss and a portion to engage said pin to lock said pin in said openings, and an internally threaded nut mounted on said threaded shank and adapted to engage and lock said annular member when turned in one direction, and to coöperate with said annular member to slowly withdraw the pin from said openings when both are turned together in the other direction, by the differential action of said threads.

4. In a cross head for locomotives, the combination with the inner and outer walls having alined openings therein and a wrist pin fitting said openings and having an exteriorly threaded shank projecting beyond said outer wall, of means for holding said wrist pin seated in said openings, and a threaded member adapted to coöperate with the threaded shank and said outer wall to remove said pin.

In testimony whereof I affix my signature.

HARRY A. HOKE.